US005107807A

United States Patent [19]

Arai et al.

[11] Patent Number: 5,107,807

[45] Date of Patent: Apr. 28, 1992

[54] PISTON FOR INTERNAL COMBUSTION ENGINE

[75] Inventors: Takayuki Arai, Yokosuka; Takaharu Goto, Yokohama; Kyugo Hamai, Yokosuka, all of Japan

[73] Assignee: Nissan Motor Company, Ltd., Japan

[21] Appl. No.: 580,544

[22] Filed: Sep. 11, 1990

[30] Foreign Application Priority Data

Sep. 28, 1989 [JP] Japan ........ 1-250527
Dec. 25, 1989 [JP] Japan ........ 1-335753

[51] Int. Cl.[5] ........ F16J 1/04; F02F 1/00

[52] U.S. Cl. ........ 123/193.6; 92/233

[58] Field of Search ........ 123/193 P; 92/232, 233, 92/177, 209, 237

[56] References Cited

U.S. PATENT DOCUMENTS

| | | | |
|---|---|---|---|
| 2,046,789 | 7/1936 | Norton | 92/233 |
| 2,120,019 | 6/1938 | Cooper | 92/233 |
| 2,136,162 | 11/1938 | Ware | 92/233 |
| 2,217,542 | 10/1940 | Flammang et al. | 92/233 |
| 2,513,814 | 7/1950 | Moore | 92/233 |
| 4,535,682 | 8/1985 | Collyear et al. . | |
| 4,648,309 | 3/1987 | Schellmann | 92/233 |
| 4,756,241 | 7/1988 | Sakurahara et al. | 92/233 |
| 4,809,652 | 3/1989 | Essig et al. . | |
| 4,831,919 | 5/1989 | Bruni | 92/233 |
| 4,856,417 | 8/1989 | Ishikawa | 92/233 |
| 5,058,489 | 10/1991 | Iwaya | 92/233 |

FOREIGN PATENT DOCUMENTS

| | | |
|---|---|---|
| 0211189 | 6/1986 | European Pat. Off. . |
| 1475846 | 6/1969 | Fed. Rep. of Germany . |
| 3022858 | 12/1981 | Fed. Rep. of Germany . |
| 57-81143 | 5/1982 | Japan . |
| 58-38357 | 3/1983 | Japan . |
| 61-3947 | 1/1986 | Japan . |
| 61-8558 | 4/1986 | Japan . |
| 62-58049 | 3/1987 | Japan . |
| 63-21352 | 1/1988 | Japan . |

*Primary Examiner*—E. Rollins Cross
*Assistant Examiner*—M. Macy
*Attorney, Agent, or Firm*—Lowe, Price, LeBlanc & Becker

[57] ABSTRACT

A piston for an internal combustion engine comprises a skirt portion formed with a piston pin hole. The skirt portion includes in an axial direction of the piston a first portion upper than an axis of the piston pin hole, and a second portion lower than the axis thereof. The first portion has a first cross section formed in accordance with a first ellipse, and the second portion has a second cross section formed in accordance with a second ellipse. The first and second ellipses have two foci, respectively, on a center plane of the piston which is perpendicular to the axis of the piston pin hole. The first ellipse is smaller in ellipticity than the second ellipse. The skirt portion including a ramp portion connecting the first portion to the second portion.

10 Claims, 9 Drawing Sheets

PISTON FOR INTERNAL COMBUSTION ENGINE

BACKGROUND OF THE INVENTION

The present invention relates to a piston for an internal combustion engine and, more particularly, to a technique of reducing friction between a skirt of the piston and a cylinder bore.

In an internal combustion engine, lubricating oil film is formed between a piston and a cylinder bore. Since friction loss increases in accordance with a contact area of the piston with the cylinder bore, it is desirable to maximally decrease the contact area of a skirt of the piston.

Generally, the skirt has a cross section in the shape of an ellipse, and becomes more nearly round due to thermal expansion thereof during engine operation, thus coming in uniform contact with the cylinder bore.

JP-A 61-81558 discloses a piston which includes a top with a plurality of piston ring grooves, and a skirt which has a cross section in the shape of an ellipse. This ellipse has a minor axis in a direction of an axis or a center line of a piston pin hole.

Referring to FIGS. 6–8, there is shown a piston 1 of the type as mentioned above. It is to be noted that a difference of dimension between portions of the piston 1 is exaggeratedly indicated in FIGS. 6–8, in spite of a considerably small difference thereof in reality.

The piston 1 includes a top 7 with a plurality of piston ring grooves 5, and a skirt 2 which is formed with a piston pin hole 3. The skirt 2 has a cross section in the shape of an ellipse which has two foci on a piston center plane $O_8$ which is perpendicular to an axis or a center line $O_7$ of the piston pin hole 3, and passes through a piston axis (no numeral). The outline of the skirt 2, which resembles a barrel, is obtained by changing a major axis of each of two ellipses $X_1$ and $Y_1$ in an axial direction of the piston 1. In this case, the skirt 2 is formed with a curved surface 4 on both sides which correspond to a direction perpendicular to a direction of the axis $O_7$ of the piston pin hole 3.

As best shown in FIG. 6, at a shoulder 6 of the skirt 2 just under the piston ring groove 5, a distance between the piston axis and the curved surface 4 is shorter than a half of a reference diameter $\phi$ D (phi D), i.e., a radius of the piston 1, by $a_1$. On the other hand, at the lower end of the skirt 2, a distance between the piston axis and the curved surface 4 is shorter than the above-mentioned radius by $a_1'$ ($a_1' < a_1$).

Since the major axis of each of the ellipses $X_1$ and $Y_1$ is changed in the axial direction of the piston 1 as described above, the outline of the skirt 2 is variable, according to a position at which the cross section is taken, as shown in FIGS. 7 and 8. Further, a length of the piston pin hole 3 is shorter by $2 \times b_1$ in a direction of the axis $O_7$ of the piston pin hole 3 than in a direction perpendicular thereto.

U.S. Pat. No. 4,535,682 discloses a piston which has a skirt which includes two portions which are urged towards an associated cylinder during the various strokes of the working cycle. Each portion is provided with a bearing surface or surfaces for sliding engagement with the associated cylinder during reciprocation, thus reducing a contact area of the skirt with the associated cylinder.

A problem encountered in the skirt 2 of the piston 1 disclosed in JP-A 61-81558 is such that:

Referring to FIG. 9, due to constant ellipticity of each of the ellipses $X_1$ and $Y_1$ in every cross section of the skirt 2, a contact area of the skirt 2 with a cylinder bore is relatively great as illustrated by a pattern C in FIG. 9, resulting in increased friction between the skirt 2 and the cylinder bore. If the above-mentioned contact area is reduced so as to eliminate such inconvenience, an operating position of the piston 1 falls in unstable, resulting in occurrence of hammering due to piston slapping.

Another problem encountered in the skirt of the piston disclosed in U.S. Pat. No. 4,535,682 is such that:

If the contact area of the skirt with the cylinder bore is excessively reduced, seizing often occurs, during low speed and high load operation of the engine, due to decreased slide speed of the piston and increased surface pressure on the skirt. Further, since a surface of the skirt should be machined not only in a three-dimensional manner, but in the precision of the order of tens of microns, a number of process of machining thereof is considerably increased.

SUMMARY OF THE INVENTION

It is, therefore, an object of the present invention to provide a piston for an internal combustion engine which has reduced contact area of a skirt with a cylinder bore, and stabilizes an operating position of the piston.

It is another object of the present invention to provide a piston for an internal combustion engine which is easy to be machined, and appropriately distributes the contact area of the skirt with the cylinder bore.

There is provided, according to the present invention, a piston for an internal combustion engine, the piston reciprocating in a cylinder bore, comprising:

a top portion; and a skirt portion formed with a piston pin hole, said skirt portion including first and second portions in an axial direction of the piston, said first portion being defined by one end of the skirt portion adjacent to said top portion and an imaginary axis of said piston pin hole, said second portion being defined by said imaginary axis of said piston pin hole and the other end of said skirt portion, said first portion having a first cross section formed in accordance with a first ellipse, said second portion having a second cross section formed in accordance with a second ellipse, said first and second ellipses having two foci on an imaginary center plane of the piston, respectively, said imaginary center plane being perpendicular to said imaginary axis of said piston pin hole, said first ellipse being smaller in ellipticity than said second ellipse, said skirt portion including a ramp portion connecting said first portion to said second portion.

DETAILED DESCRIPTION OF THE INVENTION

Figure 1:
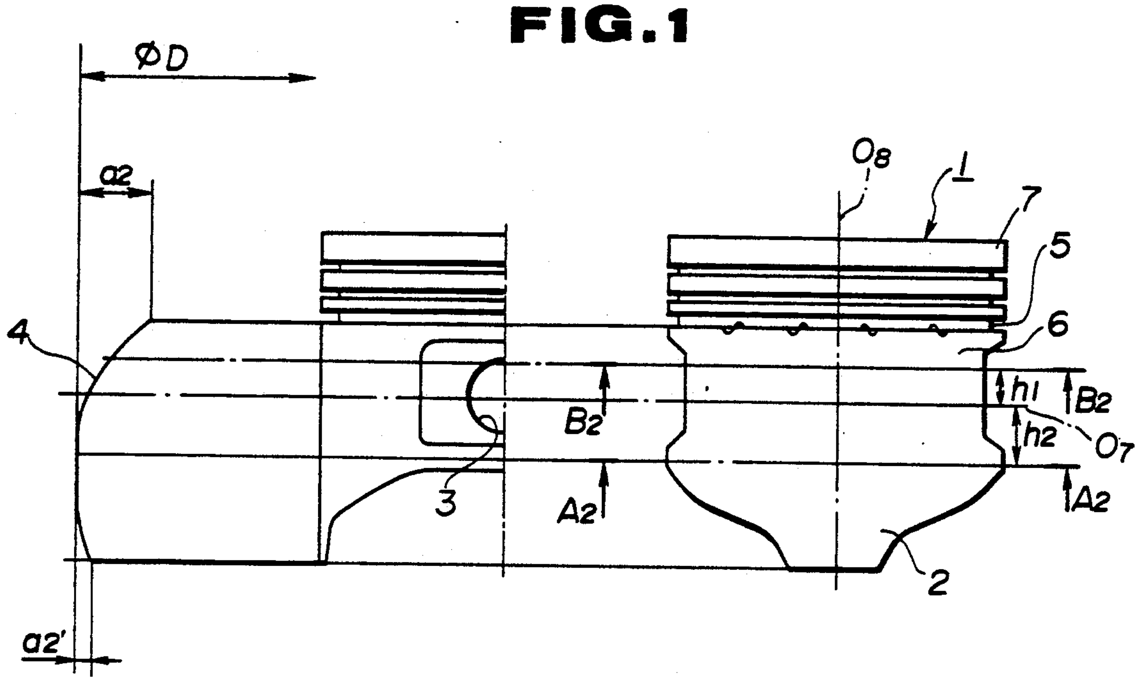
FIG. 1 is a diagrammatic view illustrating a first preferred embodiment of a piston for an internal combustion engine according to the present invention.

Referring to the accompanying drawings, preferred embodiments of a piston for an internal combustion engine according to the present invention will be described.

Referring to FIGS. 1-5, there is shown a first preferred embodiment of the present invention.

It is to be noted that, in FIGS. 1-5, elements corresponding to the elements of the prior art as shown in FIGS. 6-9 are given the same reference numerals.

Figure 2:
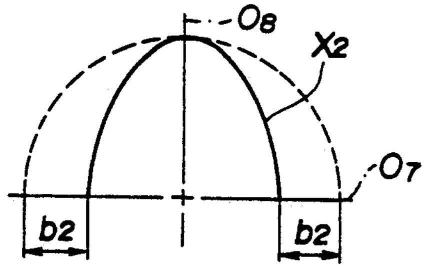
FIG. 2 is a fragmentary cross section taken along the line $A_2$—$A_2$ of FIG. 1.
Figure 3:
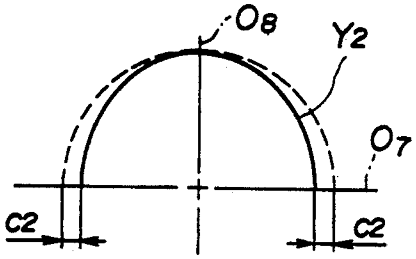
FIG. 3 is a view similar to FIG. 2, taken along the line $B_2$—$B_2$ of FIG. 1.
Figure 6:
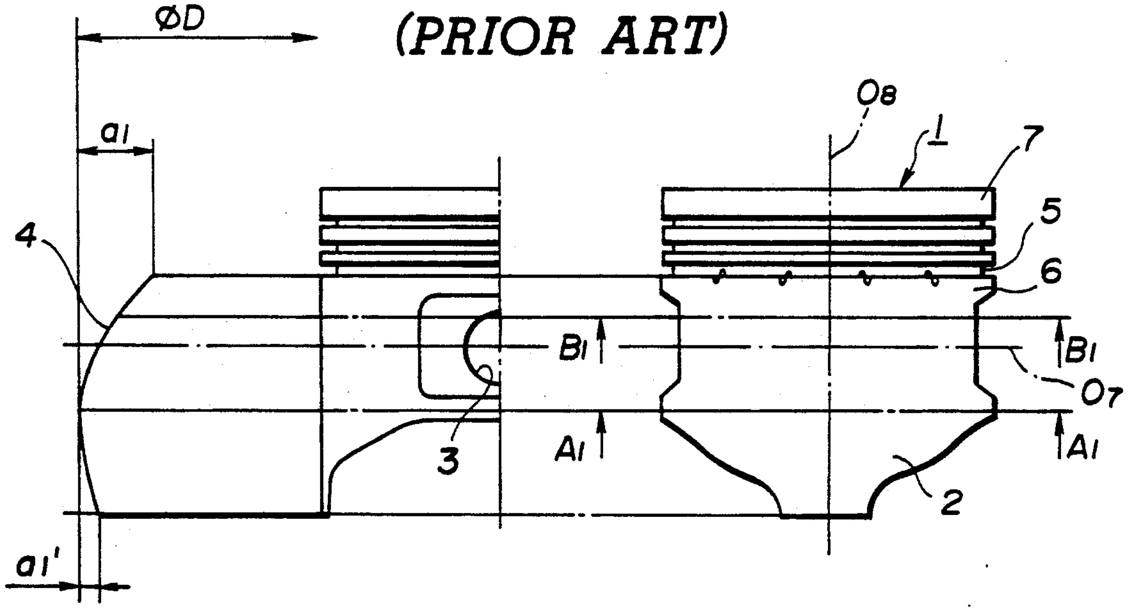
FIG. 6 (PRIOR ART)
FIG. 6 is a view similar to FIG. 1, illustrating a known piston.
Figure 7:
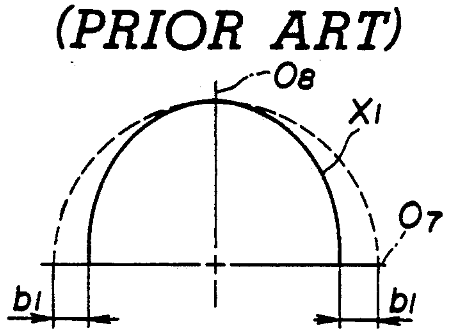
FIG.7 (PRIOR ART)
FIG. 7 is a view similar to FIG. 3, taken along the line $A_1$—$A_1$ of FIG. 6.
Figure 8:
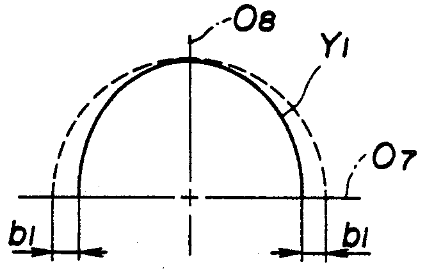
FIG.8 (PRIOR ART)
FIG. 8 is a view similar to FIG. 7, taken along the line $B_1$—$B_1$ of FIG. 6.

It is also to be noted that, in a manner similar to the prior art as shown in FIGS. 6-8, a difference of dimension between portions of a piston 1 is exaggeratedly indicated in FIGS. 1-3, in spite of a considerably small difference thereof in reality.

Referring to FIGS. 1-3, in a manner similar to the prior art as described hereinbefore, the piston 1 includes a top 7 with a plurality of piston ring grooves 5, and a skirt 2 which is formed with a piston pin hole 3. The skirt 2 has a cross section in the shape of an ellipse which has two foci on a piston center plane $O_8$ which is perpendicular to an axis or a center line $O_7$ of the piston pin hole 3, and passes through a piston axis (no numeral). The outline of the skirt 2, which resembles a barrel, is obtained by changing a major axis of each of two ellipses $X_2$ and $Y_2$ in an axial direction of the piston 1, and the skirt 2 is formed with a curved surface 4 on both sides which correspond to a direction perpendicular to the direction of the axis $O_7$ of the piston pin hole 3. It is to be noted that $a_2 > a_2'$ in FIG. 1.

Since the major axis of each of the ellipses $X_2$ and $Y_2$ is changed in the axial direction of the piston 1 as described above, the outline of the skirt 2 is variable, according to a position at which the cross section is taken, FIGS. 2 and 3.

The ellipses $X_2$ and $Y_2$ are different in ellipticity. That is, the skirt 2 is so formed as to have smaller ellipticity in a portion upper than the axis $O_7$ of the piston pin hole 3, and greater ellipticity in a portion lower than the axis $O_7$, and is constructed so that the portion with smaller ellipticity is smoothly connected to the portion with greater ellipticity.

By way of example, at a position which is $h_1$ distant upward from the axis $O_7$ of the piston pin hole 3, the skirt 2 has a cross section in the shape of the ellipse $Y_2$ as shown in FIG. 3. On the other hand, at a position which is $h_2$ distant downward from the axis $O_7$ of the piston pin hole 3, the skirt 2 has a cross section in the shape of the ellipse $X_2$ as shown in FIG. 2.

As seen from FIGS. 2 and 3, the ellipse $X_2$ has greater difference between the major and minor axes, i.e., greater ellipticity, than the ellipse $Y_2$ has ($b_2 > c_2$).

Further, the skirt 2 is so formed as to have the ellipse $Y_2$ as shown in FIG. 3 in a portion upper than the position which is $h_1$ distant upward from the axis $O_7$ of the piston pin hole 3, and the ellipse $X_2$ as shown in FIG. 2 in a portion lower than the position which is $h_1$ distant downward from the axis $O_7$ of the piston pin hole 3, and is constructed so that the upper portion is smoothly connected to the lower portion.

A position which is $h_2$ distant downward from the axis $O_7$ of the piston pin hole 3 corresponds to a position of a reference diameter $\phi D$ (phi D) of the piston 1.

Next, the operation of this embodiment will be described.

Figure 5:
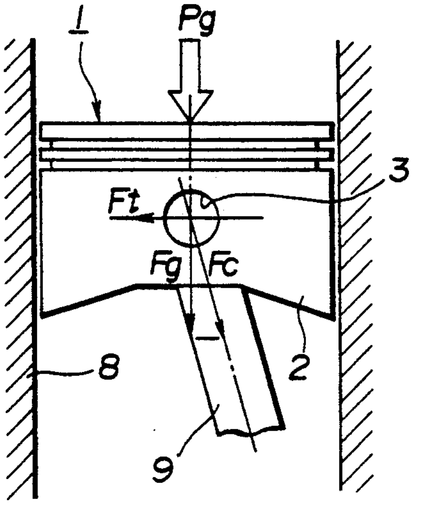
FIG. 5 is a front view illustrating the piston with a connecting rod in the cylinder bore.

Referring to FIG. 5, due to pressure of combustion gas $P_g$, the piston 1 reciprocates in the cylinder bore 8, and rotates a crankshaft (not shown) through a connecting rod 9. A resultant $F_g$ of the combustion pressure $P_g$ is divided into a force $F_c$ in an axial direction of the connecting rod 9, and a force (side pressure) $F_t$ which is perpendicular to the piston axis. When the piston 1 is thrusted on the cylinder bore 8 by the side pressure $F_t$, the skirt 2 comes in contact with the cylinder bore 8.

In this case, at a position which is $h_1$ distant upward from the axis $O_7$ of the piston pin hole 3, the skirt 2 has the ellipse $Y_2$ with smaller ellipticity, so that it comes in contact with the cylinder bore 8 in relatively large area. On the other hand, at a position which is $h_2$ distant downward from the axis $O_7$ of the piston pin hole 3, the skirt 2 has the ellipse $X_2$ with larger ellipticity, so that the skirt 2 comes in contact with the cylinder bore 8 only in small area.

Figure 4:
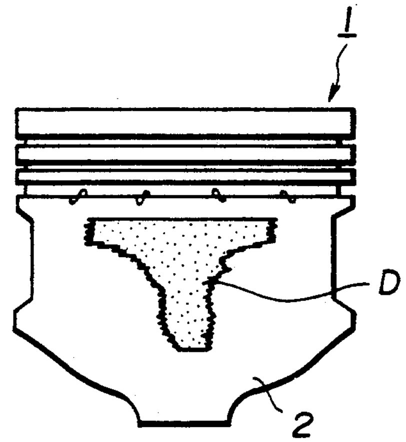
FIG. 4 is a side view illustrating the piston with contact pattern of a skirt thereof with a cylinder bore.
Figure 9:
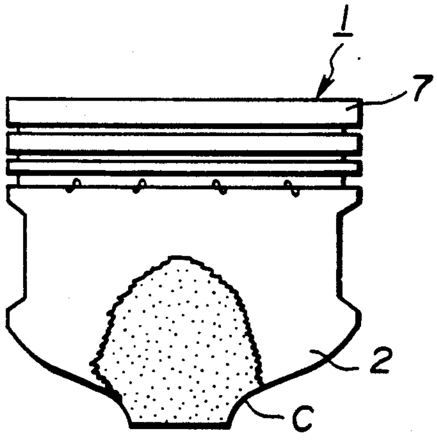
FIG.9 (PRIOR ART)
FIG. 9 is a view similar to FIG. 4, illustrating the known piston.

As a result, a contact area of the skirt 2 with the cylinder bore 8, which is as illustrated by a pattern D in FIG. 4, becomes smaller than the same in prior art as illustrated by the pattern C in FIG. 9.

Since the skirt 2 is in contact with the cylinder bore 8 in the upper portion thereof in relatively large area, the piston 1 is held by this upper portion.

This results in not only reduced friction between the skirt 2 and the cylinder bore 8, but stabilized operating position of the piston 1 or eliminated occurrence of hammering due to piston slapping.

The reason why the ellipse $Y_2$ in the portion upper than the axis $O_7$ of the piston pin hole 3 has smaller ellipticity than the ellipse $X_2$ in the portion lower than the axis $O_7$ has is as follows:

A share of the load will be considered with respect to the portion upper than the axis $O_7$ of the piston pin 3 and the portion lower than the axis $O_7$. Since the upper portion to the lower portion is in the ratio of load share 6:4, the area of the upper portion should be greater than the same of the lower portion so as to allow contact with the cylinder bore 8 with the same surface pressure. It is to be noted that the ratio of load share as mentioned above is estimated from the state of abrasion of the skirt 2. Therefore, it is desirable to have a contact area in the pattern D as shown in FIG. 4 so as to achieve lower friction.

As described hereinbefore, the ellipses $X_2$ and $Y_2$ may be different in ellipticity. That is, the skirt 2 may be so formed as to have smaller ellipticity in the portion upper than the axis $O_7$ of the piston pin hole 3, and greater ellipticity in the portion lower than the axis $O_7$.

A contact position of the skirt 2 with the ellipses $X_2$ and $Y_2$ may be variable according to each value of $a_2$ and $a_2'$ as indicated in FIG. 1.

Each value of $a_2$ and $a_2'$ as indicated in FIG. 1, $b_2$ as indicated in FIG. 2, and $c_2$ as indicated in FIG. 3 is determined in consideration of thermal expansion of the skirt 2. Further, each value of $h_1$ and $h_2$ as indicated in FIG. 1 is determined in consideration of dimension of each portion of the piston 1.

Referring to FIGS. 10-17, there is shown a second preferred embodiment of the present invention.

Figure 10:
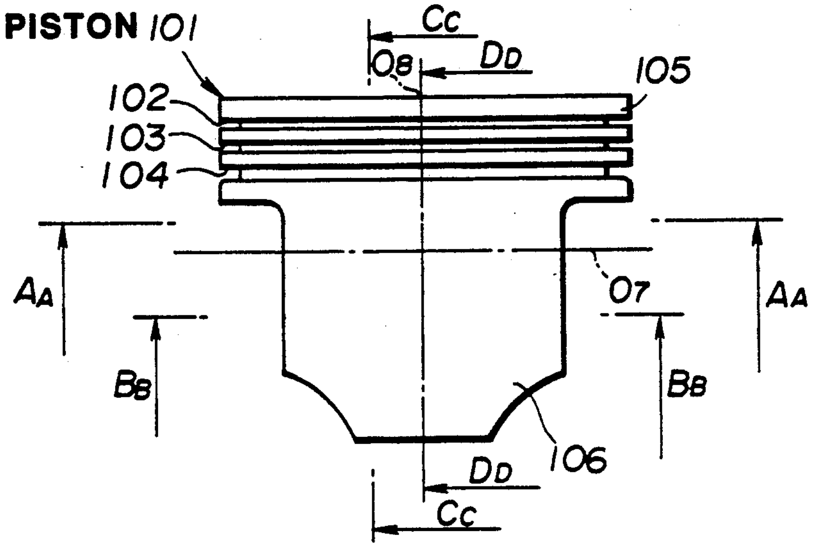
FIG. 10 is a view similar to FIG. 9, illustrating another piston for an internal combustion engine.

Referring to FIG. 10, the second preferred embodiment is generally the same in structure as the first preferred embodiment. As shown in FIG. 10, a piston 101 includes a top 105 with two piston ring grooves 102 and 103, and an oil ring groove 104, and a skirt 106 which is formed with a piston pin hole 107 (not shown in FIG. 10). The skirt 106 slidably comes in contact with a cylinder bore 110 (not shown in FIG. 10), thus controlling an operating position of the piston 101.

A reference numeral $O_7$ designates an axis or a center line of the piston pin hole 107, and $O_8$ designates a piston center plane which is perpendicular to the center line $O_7$, and passes through a piston axis (no numeral).

The skirt 106 has a cross section in the shape of an ellipse which has two foci on the piston center plane $O_8$. In this embodiment, the ellipse is slightly changed in ellipticity from the lower portion to the upper portion of the skirt 106, and at least in both side portions thereof which correspond to a direction perpendicular to a direction of the center line $O_7$ of the piston pin hole 107. It is to be noted that the ellipticity represents a ratio of a minor axis to a major axis of the ellipse, i.e., as the ellipse becomes smaller in ellipticity, it becomes more nearly round.

Figure 11:
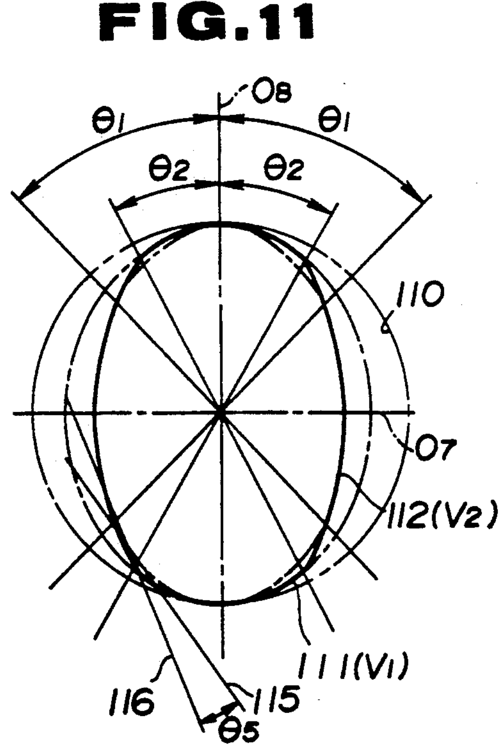
FIG. 11 is a cross section, illustrating a second preferred embodiment of a piston for an internal combustion engine according to the present invention, taken along the line $A_A$—$A_A$ of FIG. 10.

Referring to FIG. 11, in a portion of the skirt 106 upper than the center line $O_7$ of the piston pin hole 107, the cross section is formed by integrating two elliptic arcs 111 and 112, and a straight line 116. Specifically, this cross section is formed in the range of an angle $\theta_1$ (theta 1) on both sides of the piston center plane $O_8$. In a portion of each of thrust and counter thrust sides which corresponds to the range of an angle $\theta_2$ (theta 2) on both sides of the piston center plane $O_8$, the cross section is formed in accordance with the elliptic arc 111 which has a relatively small ellipticity V1, whereas in the side portion other than the above-mentioned portion, it is formed in accordance with the elliptic arc 112 which has a relatively large ellipticity $V_2$, and the straight line 116 which connects the two arcs 111 and 112. The straight line 116 intersects a tangent 115 of the elliptic arc 112 with an angle $\theta_5$ (theta 5) so as to allow gradual change from the arc 111 to the arc 112. It is to be noted that $0.3° \leqq \theta_5 < 2°$.

Figure 12:
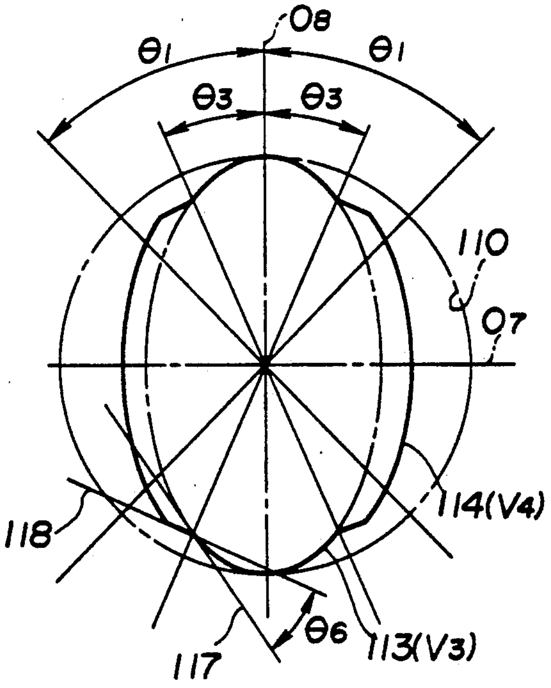
FIG. 12 is a view similar to FIG. 11, taken along the line $B_B$—$B_B$ of FIG. 10.

Referring to FIG. 12, in the portion of the skirt 106 lower than the center line $O_7$ of the piston pin hole 107, the cross section is formed by integrating two elliptic arcs 113 and 114, and a straight line 118. Specifically, in each portion of the thrust and counter thrust sides which corresponds to the range of an angle $\theta_3$ (theta 3) on both sides of the piston center plane $O_8$, this cross section is formed in accordance with the elliptic arc 113 which has a relatively large ellipticity $V_3$, whereas in the side portion other than the above-mentioned portion, it is formed in accordance with the elliptic arc 114 which has a relatively small ellipticity $V_4$, and the straight line 118 which connects the two arcs 113 and 114. The straight line 118 intersects a tangent 117 of the elliptic arc 113 with an angle $\theta_6$ (theta 6) so as to allow gradual change from the arc 113 to the arc 114. It is to be noted that $0.3° \leqq \theta_6 < 2°$.

Each of the ellipticities $V_1$–$V_4$ is set to satisfy the conditions of $V_1 \leqq V_3$ and $V_2 \leqq V_4$. The skirt 106 becomes more nearly round from the lower portion to the upper portion. With a clearance between the skirt 106 and the cylinder bore 110 during engine operation, it is set to be 0–25 μm between the thrust portion formed in accordance with the elliptic arcs 112 and 114, and the cylinder bore 110, and greater than 25 um between the side portion formed in accordance with the elliptic arcs 112 and 114, and the cylinder bore 110.

Having the cross section formed by integrating the two elliptic arcs 111 and 112, or 113 and 114, the skirt 106 has a small difference in ellipticity between the arcs 112 and 114 in each of the side portions, and to have a large difference in ellipticity between the arcs 111 and 113 in the center portion. Each of the angles $\theta_1$ (theta 1)–$\theta_3$ (theta 3) is set to satisfy the conditions of $\theta_3 < \theta_2 < \theta_1$ so as to increase a contact area of the upper portion of the skirt 106 with the cylinder bore 110.

Figure 13:
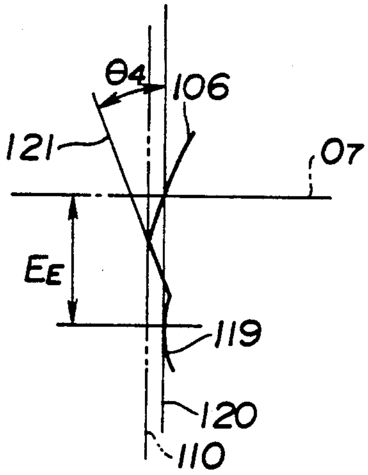
FIG. 13 is an enlarged fragmentary vertical section taken along the line $C_C$—$C_C$ of FIG. 10.
Figure 14:
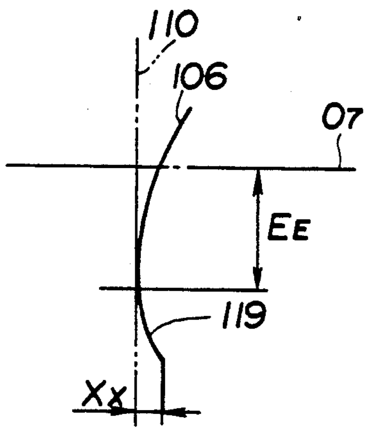
FIG. 14 is a view similar to FIG. 13, taken along the line $D_D$—$D_D$ of FIG. 10.

Referring to FIGS. 13 and 14, the skirt 106 is shaped like a barrel, i.e., it has an axial outline having a curved surface 119 which is curved inward in the upper and lower portions thereof. The skirt 106 has a linear portion both between the center portion formed in accordance with the elliptic arcs 111 and 113, and the curved surface 119, and between the side portion formed with the elliptic arcs 112 and 114, and the curved surface 119. This linear portion is formed in accordance with a straight line 121 which forms an angle of $\theta_4$ (theta 4) with a tangent 120 which touches the curved surface 119 at the maximal diameter portion thereof being $E_E$ distant downward from the center line $O_7$ of the piston pin hole 107. The ellipticity of each of the elliptic arcs 111 and 113, and 112 and 114 is set to satisfy the conditions of $0° < \theta_4 < 1°$, thus achieving a small difference in ellipticity between the arcs 111 and 113, and 112 and 114 in an axial direction of the skirt 106.

The skirt 106 has a taper amount $X_X$ (distance between the skirt 106 and the cylinder bore 110) which is larger in the lower end thereof, thus preventing scuffing of the skirt 106.

Next, the operation of this embodiment will be described.

Figure 15:
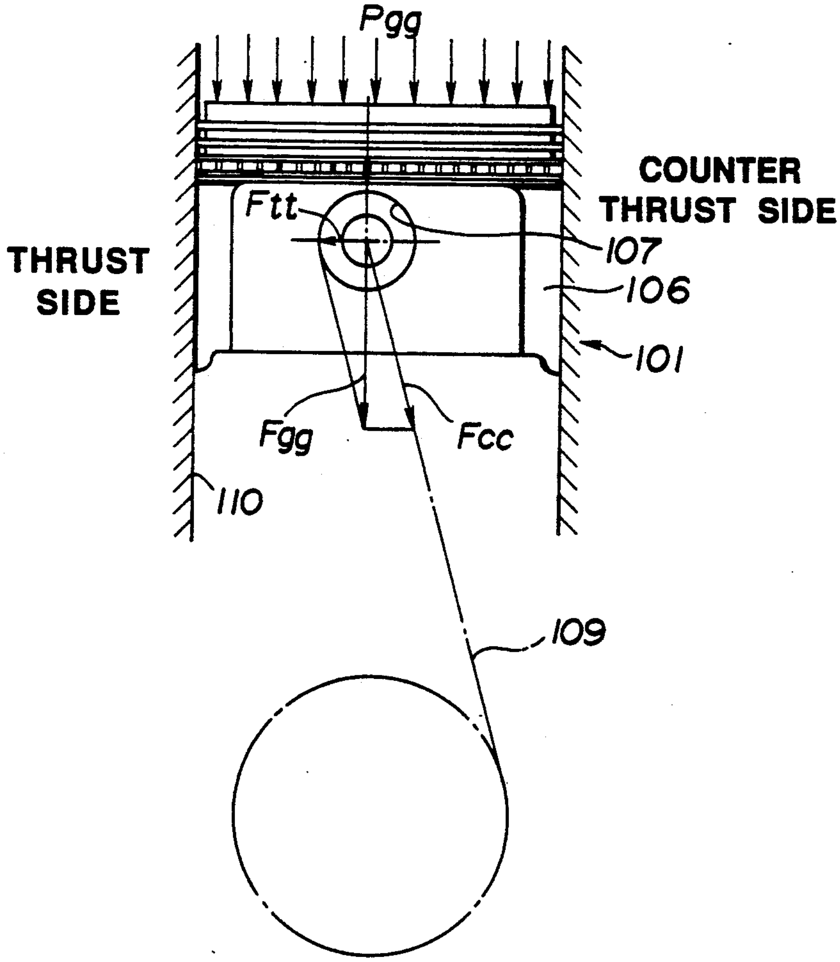
FIG. 15 is a view similar to FIG. 5.

Referring to FIG. 15, due to pressure of a combustion gas $P_{gg}$, the piston 101 reciprocates in the cylinder bore 110, and rotates a crankshaft (not shown) through a connecting rod 109. A resultant $F_{gg}$ of the combustion pressure $P_{gg}$ is divided into a force $F_{cc}$ in an axial direction of the connecting rod 109, and a force (side pressure) $F_{tt}$ which is perpendicular to the piston axis. Accordingly, on thrust and counter thrust sides, the skirt 106 is thrusted on the cylinder bore 110 by a higher pressure due to combustion pressure $P_{gg}$ and inertia force of the piston 101.

Generally, the skirt 106 has a cross section in the shape of an ellipse having a major axis which is perpendicular to the center line $O_7$ of the piston pin hole 107. During engine operation, the skirt 106 becomes more nearly round due to thermal expansion thereof, resulting in increased contact area with the cylinder bore 110. This allows an appropriate control of an operating position of the piston 101.

Figure 16:
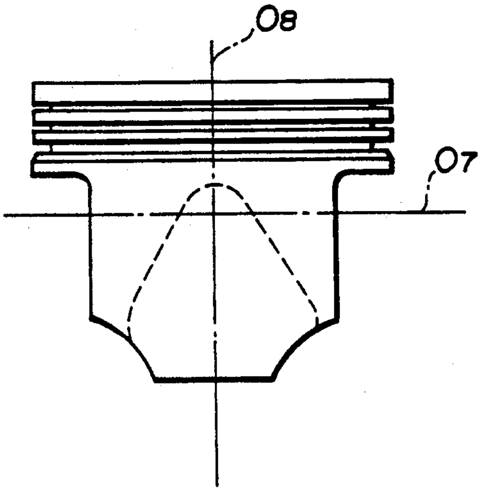
FIG. 16 (PRIOR ART)
FIG. 16 is a view similar to FIG. 9.
Figure 17:
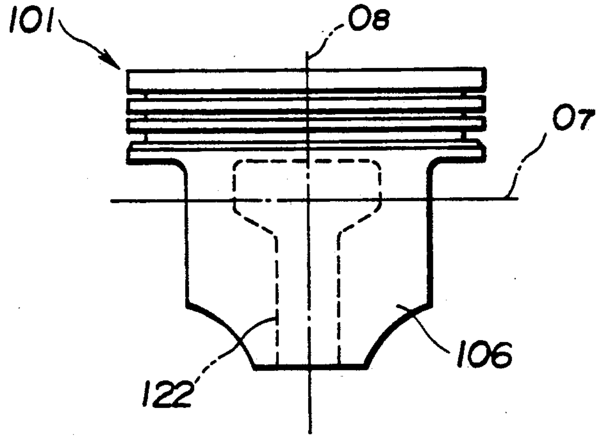
FIG. 17 is a view similar to FIG. 16, illustrating the second preferred embodiment of FIG. 11.

Referring to FIG. 16, if the skirt 106 is formed with a constant ellipticity in the upper and lower portions thereof in a manner similar to the prior art, the skirt 106 has a greater contact area with the cylinder bore 110 in the lower portion thereof which is subjected to a low load, as indicated by a pattern surrounded by a dotted line. A friction force F acting on the piston 101 increases in proportion to the contact area as indicated by Newton's law of viscosity:

$$F=S\times\eta\times dv/dh$$

where S is a contact area, $\eta$ (eta) is a viscosity of lubricating oil, and dv/dh is a speed.

In this embodiment, on both sides of the skirt 106 which correspond to the direction perpendicular to the direction of the center line $O_7$ of the piston pin hole 107, the cross section thereof decreases in ellipticity from $V_3$ to $V_1$ or becomes more nearly round from the lower portion to the upper portion, and it increases in the range of angle from $\theta_3$ (theta 3) to $\theta_2$ (theta 2). As a result, the skirt 106 comes in contact with the cylinder bore 110 along the center line $O_7$ of the piston pin hole 107 and the piston center surface $O_8$, thus forming a T-shaped contact zone 122 as indicated by a pattern surrounded by a dotted line in FIG. 17.

As described above, on the thrust and counter thrust sides, the skirt 106 is thrusted on the cylinder bore 110 by a higher pressure or load due to combustion pressure $P_{gg}$ and inertia force of the piston 101. In both side portions of the piston pin hole 107 which are subjected to the highest load, the skirt 106 becomes more nearly round so that the skirt 106 comes in contact with the cylinder bore 110 in a wide area in a circumferential direction thereof, thus sufficiently reducing the surface pressure on the skirt 106, resulting in prevention of seizing.

In the portion of the skirt 106 lower than the piston pin hole 107 which is subjected to a lower load, the cross section thereof increases in ellipticity so that the skirt 106 comes in contact with the cylinder bore 110 in a narrow area in the circumferential direction thereof, thus reducing friction loss of the piston 101. Further, in a zone other than the T-shaped contact zone 122, the skirt 106 keeps a clearance of more than 25 um with the cylinder bore 110, thus reducing the friction force F due to oil dragging.

Figure 19:
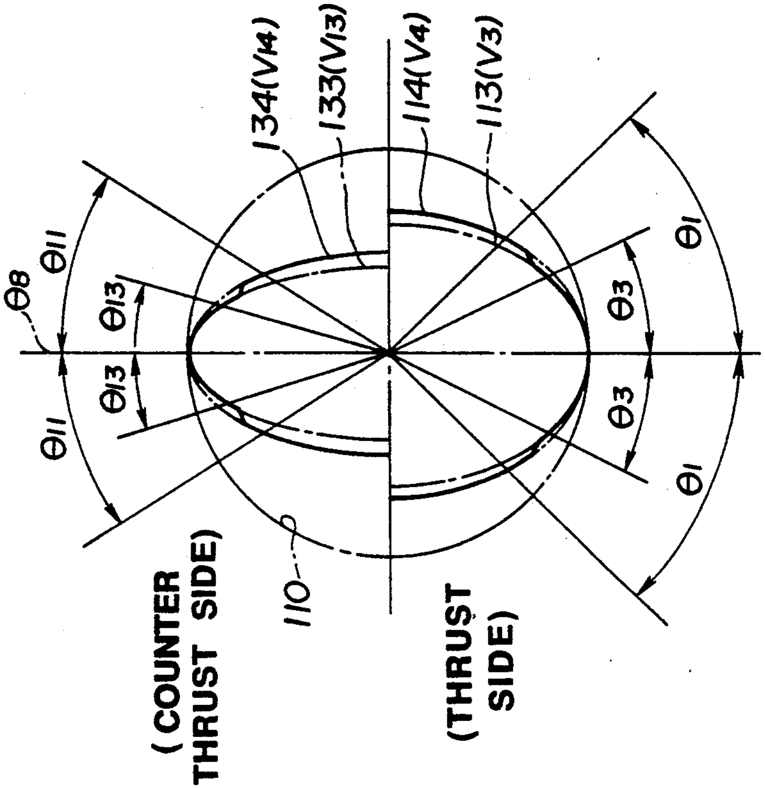
FIG. 19 is a view similar to FIG. 18, taken along the line $B_2$—$B_B$ of FIG. 10.
Figure 18:
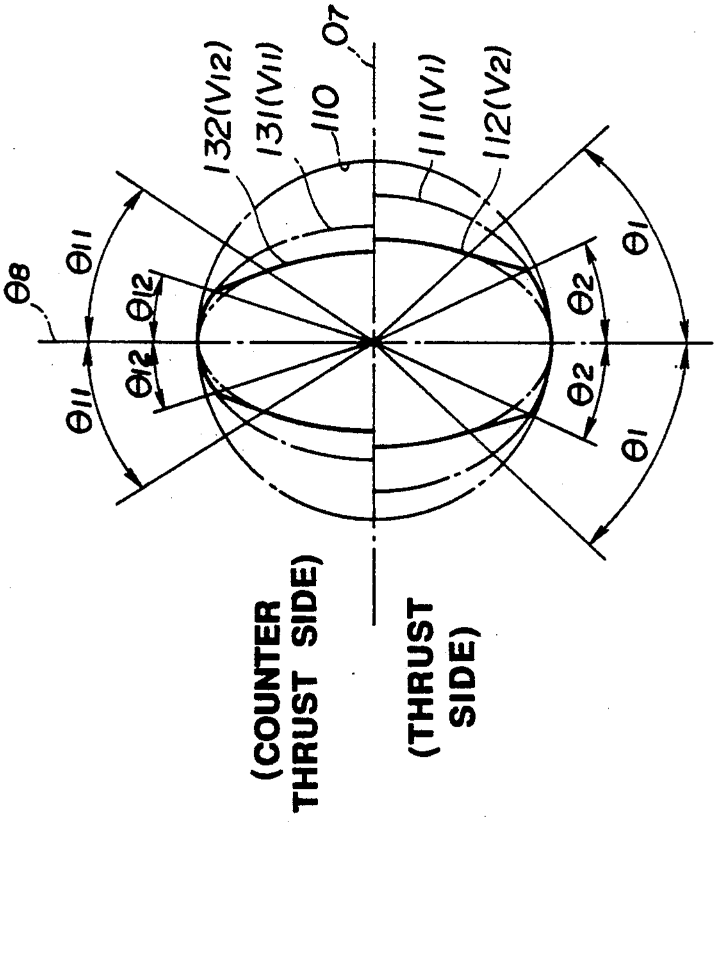
FIG. 18 is a view similar to FIG. 12, illustrating a third preferred embodiment of a piston for an internal combustion engine according to the present invention, taken along the line $A_A$—$A_A$ of FIG. 10.

Referring to FIGS. 18 and 19, there is shown a third preferred embodiment of the present invention. In this embodiment, the skirt 106 has a cross section which is asymmetrical on the thrust side and the counter thrust side, or has two different ellipticities.

Referring to FIG. 18, in the portion of the skirt 106 upper than the center line $O_7$ of the piston pin hole 107, the cross section has the range of an angle $\theta_1$ (theta 1) on the thrust side, which is larger than the range of an angle $\theta_{11}$ (theta 11) on the counter thrust side. On the thrust side, the cross section is formed by integrating an elliptic arc 111 with an ellipticity $V_1$ in a portion thereof which corresponds to the range of an angle $\theta_2$ (theta 2), and an elliptic arc 112 with a relatively large ellipticity $V_2$ in the side portion other than the above-mentioned portion. On the other hand, on the counter thrust side, the cross section is formed by integrating an elliptic arc 131 with an ellipticity $V_{11}$ ($V_{11}>V_1$) in a portion thereof which corresponds to the range of an angle $\theta_{12}$ (theta 12) ($\theta_{12}<\theta_2$), and an elliptic arc 132 with a relatively large ellipticity $V_{12}$ ($V_{12}>V_2$) in the side portion other than the above-mentioned portion.

Referring to FIG. 19, in the portion of the skirt 106 lower than the center line $O_7$ of the piston pin hole 107, the cross section also has the range of the angle $\theta_1$ (theta 1) on the thrust side, which is larger than the range of the angle $\theta_{11}$ (theta 11) on the counter thrust side. On the thrust side, the cross section is formed by integrating an elliptic arc 113 with an ellipticity $V_3$ ($V_3\geqq V_1$) in a portion thereof which corresponds to the range of an angle $\theta_3$ (theta 3), and an elliptic arc 114 with a relatively large ellipticity $V_4$ ($V_4\geqq V_2$) in the side portion other than the above-mentioned portion. On the other hand, on the counter thrust side, the cross section is formed by integrating an elliptic arc 133 with an ellipticity $V_{13}$ ($V_{13}>V_3$ and $V_{13}\geqq V_{11}$) in a portion thereof which corresponds to the range of an angle $\theta_{13}$ (theta 13) ($\theta_{13}<\theta_3$), and an elliptic arc 132 with a relatively large ellipticity $V_{14}$ ($V_{14}>V_4$ and $V_{14}\geqq V_{12}$) in the side portion other than the above-mentioned portion.

Figure 20:
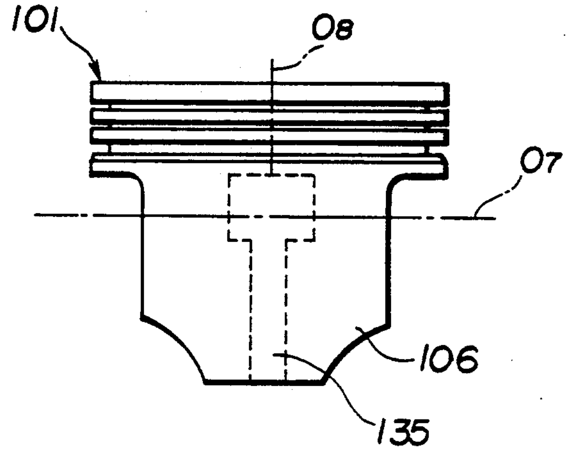
FIG. 20 is a view similar to FIG. 17, illustrating the third preferred embodiment.

Since the skirt 106 is thrusted on a cylinder bore 110 principally by an inertia force thereof on the counter thrust side, whereas the skirt 106 is thrusted thereon by a combustion pressure $P_{gg}$ on the thrust side, the skirt 106 is subjected to a smaller load on the counter thrust side. In this situation, the skirt 106 comes in contact with the cylinder bore 110 in a reduced T-shaped zone as indicated by a pattern surrounded by a dotted line in FIG. 20, thus further decreasing friction loss of the piston 101.

Figure 21:
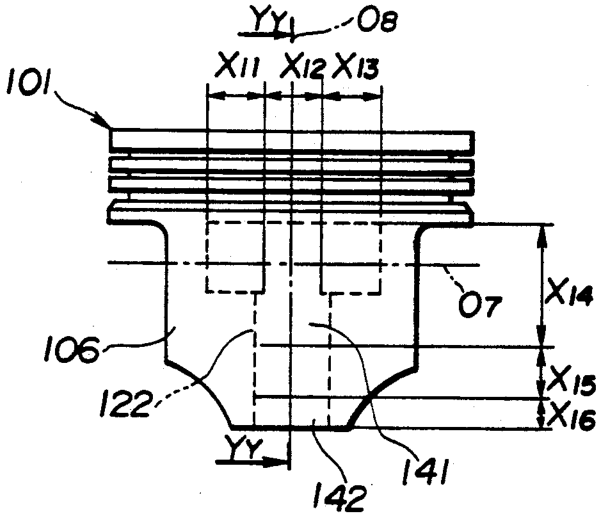
FIG. 21 is a view similar to FIG. 20, illustrating a fourth preferred embodiment of a piston for an internal combustion engine according to the present invention.
Figure 22:
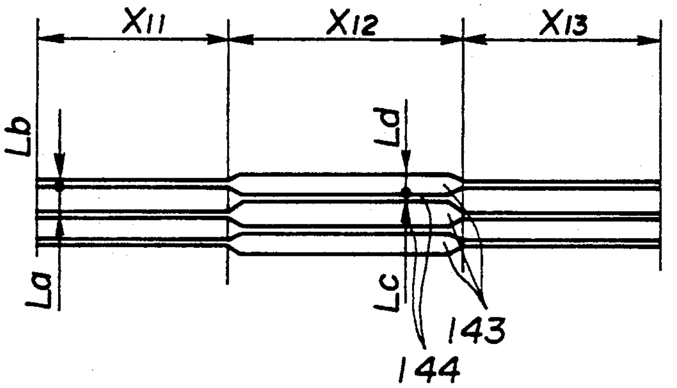
FIG. 22 is an enlarged fragmentary detail of the skirt of FIG. 21.
Figure 23:
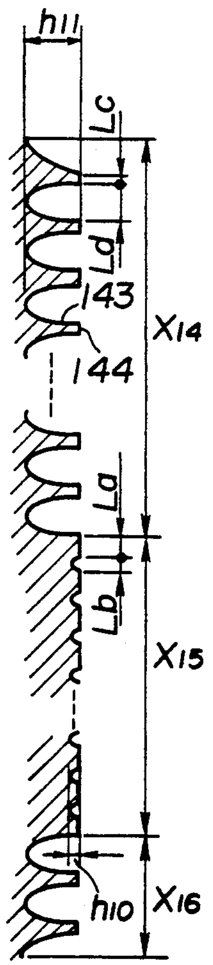
FIG. 23 is a view similar to FIG. 14, taken along the line $Y_Y$—$Y_Y$ of FIG. 21.

Referring to FIG. 21, there is shown a fourth preferred embodiment of the present invention. On both sides of the skirt 106 which correspond to a direction perpendicular to a direction of the center line $O_7$ of the piston pin hole 107, the cross section thereof decreases in ellipticity from the lower portion to the upper portion. As a result, the skirt 106 comes in contact with the cylinder bore 110 along the center line $O_7$ of the piston pin hole 107 and the piston center plane $O_8$, thus forming a T-shaped contact zone 122 as indicated by a pattern surrounded by a dotted line in FIG. 21. Referring also to FIGS. 22 and 23, the skirt 106 is formed, in a circumferential direction thereof, with a plurality of grooves 143 which are changed in depth in the circumferential direction. Further, in the T-shaped contact zone are provided center and lower zones 141 and 142, each including the grooves 143 with relatively large opening.

Referring to FIGS. 22 and 23, in the zones 141 and 142, the depth of the groove 143 is largely changed from $h_{10}$ to $h_{11}$ in a predetermined proportion, and the opening thereof is increased from $L_b$ to $L_d$, thus reducing a width of a beltlike surface 144 which exists between the grooves 143 from $L_a$ to $L_c$.

Since the depth of the grooves 143 is changed also in the T-shaped contact zone 122, and the contact area of the skirt 106 with the cylinder bore 110 is reduced in the center zone 141 and the lower zone 142, friction force due to oil dragging is further decreased, and excellent lubrication is possible due to oil remained in the grooves 143.

What is claimed is:

1. A piston for an internal combustion engine, the piston reciprocating in a cylinder bore, comprising:

a top portion; and a skirt portion formed with a piston pin hole, said skirt portion including first and second portions in an axial direction of the piston, said first portion being defined by one end of the skirt portion adjacent to said top portion and an imaginary axis of said piston pin hole, said second portion being defined by said imaginary axis of said piston pin hole and the other end of said skirt portion, said first portion having a first cross section formed in accordance with a first ellipse, said second portion having a second cross section formed in accordance with a second ellipse, said first and second ellipses having two foci on an imaginary center plane of the piston, respectively, said imaginary center plane being perpendicular to said imaginary axis of said piston pin hole, said first ellipse being smaller in ellipticity than said second ellipse, said skirt portion including a ramp portion connecting said first portion to said second portion.

2. A piston as claimed in claim 1, wherein said first and second ellipses are formed in the range of a first predetermined angle on both sides of said imaginary center plane of the piston.

3. A piston as claimed in claim 1, wherein said first cross section is formed in accordance with a third ellipse which is formed in the range of a second predetermined angle on said both sides of said imaginary center plane of the piston, and said second cross section is formed in accordance with a fourth ellipse which is formed in the range of a third predetermined angle on said both sides of said imaginary center plane of the piston.

4. A piston as claimed in claim 3, wherein said third predetermined angle is smaller than said second predetermined angle, and said second predetermined angle is smaller than said first predetermined angle.

5. A piston as claimed in claim 3, wherein said third ellipse is smaller in ellipticity than said first ellipse, and said fourth ellipse is smaller in ellipticity than said second ellipse.

6. A piston as claimed in claim 3, wherein said first cross section includes a first straight line which connects said first ellipse with said third ellipse, and said second cross section includes a second straight line which connects said second ellipse with said fourth ellipse.

7. A piston as claimed in claim 6, wherein said first straight line intersects with a fourth predetermined angle a tangent of said third ellipse which passes a point thereon at said second predetermined angle, and said second straight line intersects with a fifth predetermined angle a tangent of said fourth ellipse which passes a point thereon at said third predetermined angle.

8. A piston as claimed in claim 2, wherein said first and second ellipses are formed in the range of a first predetermined angle on a thrust side of the piston, and in the range of a sixth predetermined angle on a counter thrust side thereof which is smaller than said first predetermined angle.

9. A piston as claimed in claim 1, wherein said skirt portion is formed with a plurality of grooves in a circumferential direction thereof.

10. A piston as claimed in claim 9, wherein said plurality of grooves have a relatively large opening in a portion of said skirt portion which comes in contact with the cylinder bore.

* * * * *